(12) United States Patent
Shao et al.

(10) Patent No.: US 11,200,687 B2
(45) Date of Patent: Dec. 14, 2021

(54) IMAGE REGISTRATION METHOD, AND IMAGE STITCHING METHOD AND APPARATUS

(71) Applicants: SUZHOU MICROVIEW MEDICAL TECHNOLOGIES CO., LTD., Suzhou (CN); WUXI HISKY MEDICAL TECHNOLOGIES CO., LTD., Wuxi (CN)

(72) Inventors: Jinhua Shao, Suzhou (CN); Houli Duan, Suzhou (CN); Jin Sun, Suzhou (CN); Qiang Wang, Suzhou (CN)

(73) Assignee: SUZHOU MICROVIEW MEDICAL TECHNOLOGIES CO., LTD., Wuxi (CN)

( * ) Notice: Subject to any disclaimer, the term of this patent is extended or adjusted under 35 U.S.C. 154(b) by 5 days.

(21) Appl. No.: 16/850,032

(22) Filed: Apr. 16, 2020

(65) Prior Publication Data

US 2020/0242786 A1   Jul. 30, 2020

Related U.S. Application Data

(63) Continuation of application No. PCT/CN2018/110251, filed on Oct. 15, 2018.

(30) Foreign Application Priority Data

Oct. 16, 2017   (CN) .......................... 201710958427.6

(51) Int. Cl.
*G06T 7/32* (2017.01)
*G06T 7/33* (2017.01)
(Continued)

(52) U.S. Cl.
CPC .............. *G06T 7/32* (2017.01); *G06T 3/4038* (2013.01); *G06T 7/0002* (2013.01); *G06T 7/337* (2017.01)

(58) Field of Classification Search
CPC ... G06T 7/11; G06T 7/32; G06T 7/002; G06T 7/337; G06T 7/136; G06T 3/4038; G06T 3/0068; G06T 2207/10056
See application file for complete search history.

(56) References Cited

U.S. PATENT DOCUMENTS 5,251,271 A * 10/1993 Fling ...................... G06T 3/0081
358/527
7,620,269 B1 * 11/2009 Nandy ...................... G06T 7/37
348/263

(Continued)

FOREIGN PATENT DOCUMENTS

| CN | 101112315 A | 1/2008 |
| CN | 101984463 A | 3/2011 |

(Continued)

OTHER PUBLICATIONS

Zhong Qu et al.: "The improved Algorithm of Fast Panorama Stitching for Image Sequence and Reducing the Distortion Errors", Sep. 13, 2015, Hindawi Publishing Corporation, vol. 2015, Article ID 428076, pp. 2-11. (Year: 2015).*

(Continued)

*Primary Examiner* — John B Strege
(74) *Attorney, Agent, or Firm* — J.C. Patents

(57) ABSTRACT

Embodiments of the present disclosure provide an image registration method and apparatus, and an image stitching method and device. The image registration method includes: calculating a correlation coefficient image between a reference image and a floating image; calculating a gradient image of the correlation coefficient image; determining a pixel with extreme correlation coefficient in the correlation coefficient image according to a pixel with extreme gradient in the gradient image; and registering the reference image and the floating image according to the pixel with extreme correlation coefficient. The above image registration method (Continued)

and apparatus have high universality, require a small amount of calculation, and can ensure real-time operation and obtain a more accurate registration result. The image stitching method and device are realized based on the image registration method, thereby improving the speed and accuracy.

6 Claims, 9 Drawing Sheets

(51) Int. Cl.
  G06T 3/40 (2006.01)
  G06T 7/00 (2017.01)

(56) References Cited

U.S. PATENT DOCUMENTS

| | | |
|---|---|---|
| 2008/0089558 A1 | 4/2008 | Vadon et al. |
| 2009/0161988 A1 | 6/2009 | Wredenhagen |
| 2010/0067769 A1 | 3/2010 | Neemuchwala et al. |
| 2011/0299755 A1 | 12/2011 | Zou |
| 2013/0208997 A1* | 8/2013 | Liu ..................... G06T 3/4038 382/284 |

FOREIGN PATENT DOCUMENTS

| | | |
|---|---|---|
| CN | 103714547 A | 4/2014 |
| CN | 107705246 A | 2/2018 |
| KR | 1020140119372 A | 10/2014 |
| RU | 2580473 C1 | 4/2016 |

OTHER PUBLICATIONS

The Chinese International Search Report of corresponding International application No. PCT/CN2018/110251, dated Dec. 28, 2018.
The EESR of parallel EP application.
The first Office Action of RU application No. 2020115412.
"The Improved Algorithm of Fast Panorama Stitching for Image Sequence and Reducing the Distortion Errors", Hindawi Publishing Corporation, Mathematical Problems in Engineering, vol. 2015, Article ID 428076, 12 pages.
The first Office Action of parallel KR application.

\* cited by examiner

100

S120 — A correlation coefficient image between a reference image and a floating image is calculated S140 — A gradient image of the correlation coefficient image is calculated S160 — A pixel with extreme correlation coefficient in the correlation coefficient image is determined according to a pixel with extreme gradient in the gradient image S180 — The reference image and the floating image are registered according to the pixel with extreme correlation coefficient

FIG. 1

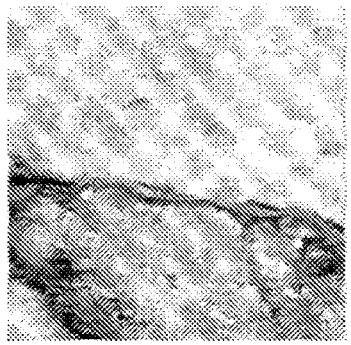  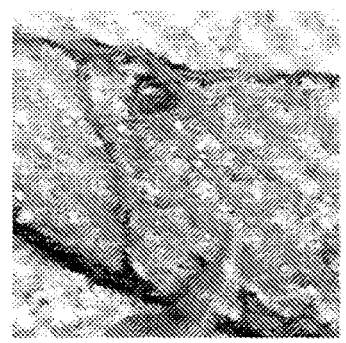
FIG. 2A            FIG. 2B            FIG. 2C
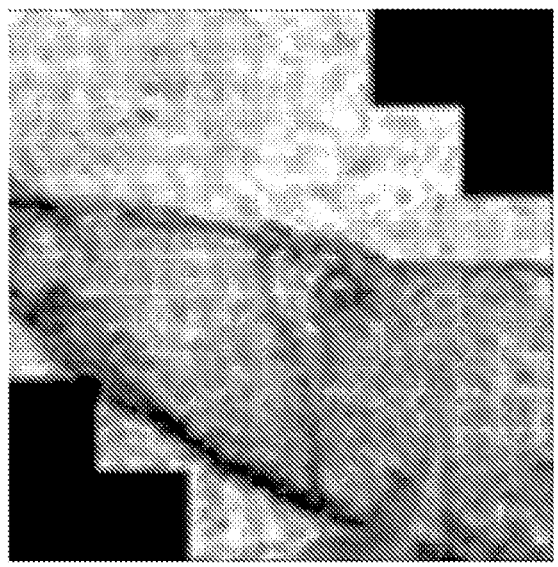
FIG. 3

| | | | | |
|---|---|---|---|---|
| 8.7901 | 9.4457 | 9.8323 | 10.0861 | 10.2136 |
| 10.0305 | 10.8834 | 11.0601 | 11.4688 | 11.8353 |
| 9.9821 | 11.1069 | 12.2751 | 12.9581 | 13.0238 |
| 8.6650 | 9.5523 | The peak value of gradient 2.6874 | | 12.4985 |
| 7.9840 | 7.7966 | 7.4924 | 7.7173 | 8.4665 |
| 9.6433 | 9.3428 | 6.8861 | 2.7650 | 4.2165 |
| 12.5218 | 12.7725 | 12.6381 | 11.5860 | 10.0821 |
| 15.1356 | 15.7032 | 15.6052 | 16.6713 | 15.0144 |
| 16.3580 | 16.8382 | 17.1049 | 16.9728 | 16.1214 |

FIG. 7

| | | | | |
|---|---|---|---|---|
| 8.4079 | 8.4083 | The searching direction of the extreme correlation coefficient 8.4063 | 8.4060 | 8.4071 |
| 8.4126 | 8.4134 | 8.4134 | 8.4133 | 8.4126 |
| 8.4178 | 8.4191 | 8.4195 | 8.4194 | 8.4188 |
| 8.4217 | 8.4243 | 8.4259 | 8.4263 | 8.4255 |
| 8.4238 | 8.4277 | 8.4318 | 8.4321 | 8.4310 |
| 8.4233 | 8.4278 | 8.4317 → | 8.4340 | 8.4330 |
| 8.4200 | 8.4244 | 8.4292 | 8.4303 | 8.4300 |
| 8.4144 | 8.4180 | 8.4208 | 8.4225 | 8.4232 |
| 8.4071 | 8.4100 | 8.4122 | 8.4138 | 8.4150 |

The position of the peak value of the gradients, the search point

FIG. 8

IMAGE REGISTRATION METHOD, AND IMAGE STITCHING METHOD AND APPARATUS

CROSS-REFERENCE TO RELATED APPLICATIONS

This application is a continuation of International Application No. PCT/CN2018/110251, filed on Oct. 15, 2018, which claims priority to Chinese Patent Application No. 201710958427.6, filed on Oct. 16, 2017. The disclosures of the aforementioned applications are hereby incorporated by reference in their entireties.

TECHNICAL FIELD

The present disclosure relates to the field of image processing and, in particular, to an image registration method and apparatus, and an image stitching method and device.

BACKGROUND

In many application scenarios in the field of image processing, image registration and stitching operations are required. Through the registration operation, the displacements of the floating image (or moving image, current image) relative to the reference image (previous image) in both the abscissa and ordinate directions can be obtained. The stitching operation stitches the floating image and the reference image into one image according to the registration result obtained by the registration operation.

For example, in the field of microscope scanning applications, since the limitation of the field of view, it is necessary to register and stitch multiple images acquired continuously while the probe is moving. The entire operation process is required to be fast and accurate. Rigid body registration can be used, that is, only the translation component of the rigid body coordinate transformation needs to be solved.

The traditional rigid body registration method uses an iterative method to optimize a cost function representing the difference between a reference image and a floating image to obtain a translation vector. Because iterative processes require a lot of calculations, they are not suitable for real-time applications.

In order to avoid iterative calculations and obtain translation vectors quickly, a registration method called the correlation coefficient peak method (correlation coefficient method) has been developed. There is a correlation coefficient between the floating image with any translation vector and the reference image. When the floating image is well aligned with the reference image, the correlation coefficient is the maximum. If the maximum value of the correlation coefficients corresponding to all possible translation vectors is found through search, then the appropriate displacement that can be used to register the floating image is determined accordingly. However, this method is only suitable for images reconstructed by the phase recovery method. In many application scenarios, such as field of view stitching applications, floating images will definitely have new content that is different from the reference image. This will bring great errors to the above correlation coefficient method. Especially when the moving speed of the probe of the microscope that captures the image is high, the difference between the content presented in the floating image and the reference image is relative large, and a wrong registration result which is completely different from the real displacement will be obtained.

SUMMARY

The present disclosure is proposed in consideration of the above problems. The present disclosure provides an image registration method and apparatus, and an image stitching method and device.

According to one aspect of the present disclosure, an image registration method is provided, which includes:
calculating a correlation coefficient image between a reference image and a floating image;
calculating a gradient image of the correlation coefficient image;
determining a pixel with extreme correlation coefficient in the correlation coefficient image according to a pixel with extreme gradient in the gradient image; and
registering the reference image and the floating image according to the pixel with extreme correlation coefficient.

Exemplary, the determining a pixel with extreme correlation coefficient in the correlation coefficient image according to a pixel with extreme gradient in the gradient image includes:
searching for a pixel with a maximum gradient in the gradient image as the pixel with extreme gradient;
determining a corresponding pixel in the correlation coefficient image according to a position of the pixel with extreme gradient; and
finding the pixel with extreme correlation coefficient according to the corresponding pixel in the correlation coefficient image.

Exemplary, the finding the pixel with extreme correlation coefficient according to the corresponding pixel in the correlation coefficient image includes:
determining an adjacent pixel of the corresponding pixel in the correlation coefficient image as a search point; and
traversing adjacent pixels of the search point and taking, if the adjacent pixels are all smaller than the search point, the search point as the pixel with extreme correlation coefficient; otherwise, taking a maximum adjacent pixel as a new search point for re-finding.

Exemplary, the determining a pixel with extreme correlation coefficient in the correlation coefficient image according to a pixel with extreme gradient in the gradient image includes:
searching for a pixel with a maximum gradient in the gradient image;
determining a first gradient threshold according to the pixel with maximum gradient;
performing region segmentation on the gradient image according to the first gradient threshold; and
for each segmented region, determining a candidate pixel with extreme correlation coefficient in the correlation coefficient image, and determining whether the candidate pixel can be taken as the pixel with extreme correlation coefficient according to the gradient of pixel, which corresponds to the candidate pixel and is in the gradient image, and a second gradient threshold.

Exemplary, the performing region segmentation on the gradient image according to the first gradient threshold includes:
performing a progressive scan on the gradient image according to the first gradient threshold, to search for seed pixels larger than the first gradient threshold; and performing region segmentation on the gradient image according to the seed pixels, to obtain all of the segmented regions.

Exemplary, the performing region segmentation on the gradient image according to the seed pixels includes: performing region segmentation on the gradient image according to a region growing algorithm by taking the seed pixels as the starting point.

Exemplary, the determining a first gradient threshold according to the pixel with maximum gradient includes:

calculating the first gradient threshold according to a formula $T_1=T_{max}*\text{In}$, where $T_1$ represents the first gradient threshold, $T_{max}$ represents the pixel with maximum gradient, and In represents a coefficient.

According to another aspect of the present disclosure, an image registration apparatus is provided, which includes:

a memory, configured to store program;

a processor, configured to run the program;

where the program is used to perform following steps when being run by the processor:

calculating a correlation coefficient image between a reference image and a floating image;

calculating a gradient image of the correlation coefficient image;

determining a pixel with extreme correlation coefficient in the correlation coefficient image according to a pixel with extreme gradient in the gradient image; and registering the reference image and the floating image according to the pixel with extreme correlation coefficient.

According to another aspect of the present disclosure, an image stitching method is further provided, which includes:

registering the reference image and the floating image according to the above image registration method; and stitching the reference image and the floating image according to the registered result.

According to still another aspect of the present disclosure, an image stitching device is further provided, which includes:

a memory, configured to store program;

a processor, configured to run the program;

where the program is used to perform the following steps when being run by the processor:

registering the reference image and the floating image according to the above image registration method; and stitching the reference image and the floating image according to the registered result.

The above image registration method and apparatus have high universality, which can be applied to various images, rather than only the images reconstructed by using the phase recovery method. In addition, the image registration method and apparatus require a small amount of calculation, thereby ensuring real-time operation. Finally, the registration results obtained by the image registration method and apparatus are more accurate. Even if there are many new contents in the floating image compared with that of the reference image, the image registration method and apparatus can also obtain good registration results.

The above image stitching method and device make use of the above image registration method and apparatus, thereby ensuring the real-time and accuracy of the stitching operation.

BRIEF DESCRIPTION OF DRAWINGS

The above and other purposes, features and advantages of the present disclosure will become more obvious through a more detailed description of the embodiments of the present disclosure in combination with the accompanying drawings. The accompanying drawings are used to provide a further explanation of the embodiments of the present disclosure and form a part of the description. The accompanying drawings, together with the embodiments of the present disclosure, are used to explain the present disclosure and do not constitute a limitation of the present disclosure. In the drawings, the same reference numerals usually represent the same or similar parts or steps.

FIG. 1 shows a schematic flow chart of an image registration method according to an embodiment of the present disclosure;

FIG. 2A, FIG. 2B and FIG. 2C respectively show three images to be registered according to an embodiment of the present disclosure;

FIG. 3 shows a resulting image of spatial registration, through two registration operations, and stitching of the images shown in FIG. 2A, FIG. 2B and FIG. 2C;

FIG. 7 shows pixels in a gradient image according to an embodiment of the present disclosure;

FIG. 8 shows pixels in the correlation coefficient image taken as the basis for calculating the gradient image shown in FIG. 7;

DESCRIPTION OF EMBODIMENTS

Figure 4:
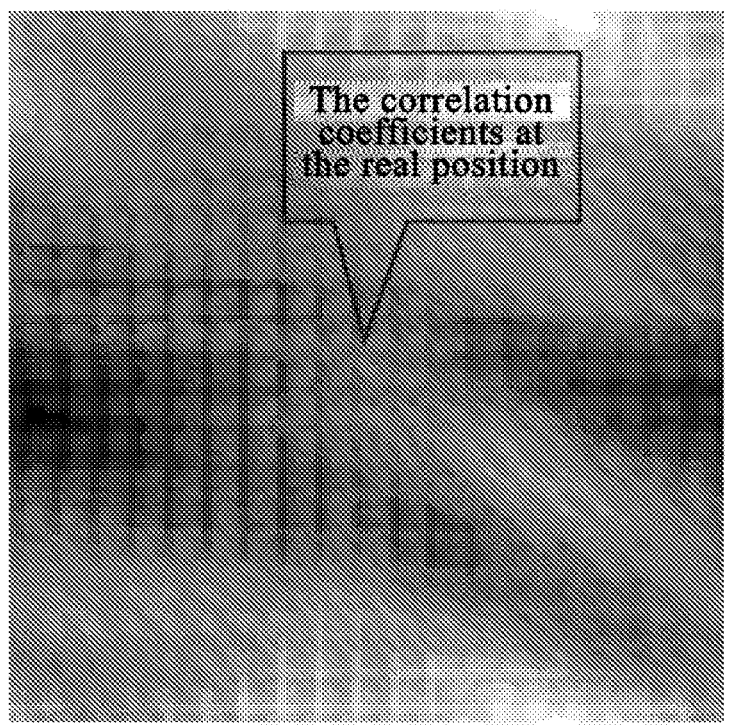
FIG. 4 shows a correlation coefficient image obtained by using the images shown in FIG. 2A and FIG. 2C as the reference image and the floating image for image registration respectively.

In order to make the purpose, technical scheme and advantages of the present disclosure more obvious, an example embodiment of the present disclosure will be described in detail below according to the accompanying drawings. Obviously, the embodiments described are only some embodiments of the present disclosure and not all embodiments of the present disclosure, and it shall be understood that the present disclosure is not limited by the example embodiments described herein. Based on the embodiments of the present disclosure described in the present disclosure, all other embodiments obtained by those skilled in the art without creative efforts shall fall within the protection scopes of the present disclosure.

FIG. 1 shows an image registration method 100 according to an embodiment of the present disclosure. The image registration method 100 is used to register a reference image and a floating image. The reference image can be used as a benchmark image, and the image registration method 100 is used to calculate the displacement of the floating image relative to the reference image. After image registration, the same content between the reference image and the floating image will overlap in space. FIG. 2A, FIG. 2B and FIG. 2C respectively show three images to be registered. FIG. 3 shows a resulting image of spatial registration, through two registration operations, and stitching of the images shown in FIG. 2A, FIG. 2B and FIG. 2C. In the first registration operation, the image shown in FIG. 2A is the reference image, and the image shown in FIG. 2B is the floating image. In the second registration operation, the image shown in FIG. 2B is the reference image, and the image shown in FIG. 2C is the floating image.

The reference image and the floating image can be a variety of images, especially images in the same mode, that is, images acquired by same image acquisition equipment, such as images from a same microscope. As mentioned above, in order to expand the scan scope of the microscope, real-time stitching operation is required, which requires fast calculation. Images from the same microscope are two-dimensional images, and the overlapping area of adjacent frames is relatively large, which makes the image registration method more accurate.

As shown in FIG. 1, in step S120, a correlation coefficient image between a reference image and a floating image is calculated.

The correlation coefficient image is essentially a digital matrix, where each element represents the correlation coefficient of the displacement between the reference image and the floating image corresponding to the element. The positional relation of adjacent pixels corresponds to a unit displacement in the positive or negative direction of the horizontal or vertical coordinates between the floating image and the reference image. Exemplary, the correlation coefficient image can be calculated by using the correlation coefficient method. The correlation coefficient image is four times the size of a reference image. For example, if both the reference image and the floating image are 100*200, the correlation coefficient image is 200*400.

According to an embodiment of the present disclosure, the correlation coefficients can be obtained through calculation including a conjugate multiplication of the Fourier transforms of the reference image and the floating image, and an inverse Fourier transform thereafter, and all possible correlation coefficients form a correlation coefficient image.

$$r_{fg}(x_i, y_i) = \sum_{u,v} F(u, v) G^*(u, v) \exp\left[i2\pi\left(\frac{ux_i}{M} + \frac{vy_i}{N}\right)\right],$$

where $r_{fg}(x_i, y_i)$ represents the pixel value at the position of $(x_i, y_i)$ in the correlation coefficient image, F(u v) and G(u v) represents the Fourier transform of the reference image and the floating image respectively, and M and N represent the number of columns and rows of the reference image respectively.

In step S140, a gradient image of the correlation coefficient image is calculated. Similar to the correlation coefficient image, the gradient image is essentially a digital matrix, where each element represents a gradient of a corresponding position in the correlation coefficient image.

Figure 5:
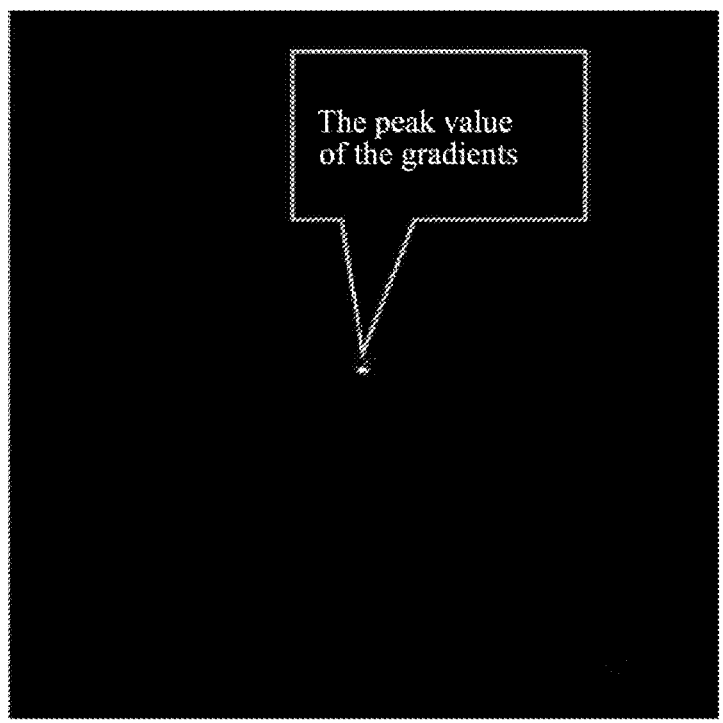
FIG. 5 shows a gradient image of the correlation coefficient image shown in FIG. 4.

As mentioned above, the existing correlation coefficient method is usually used for the image reconstructed by using the phase recovery method. In general, by searching a maximum value of the correlation coefficients corresponding to all possible displacements, the correct displacement that can be used to register floating image is determined. However, when the reference image and the floating image are not the images reconstructed by the phase recovery method, the maximum correlation coefficient in the image does not appear at the real position, but at the edge of the image, which is very far away from the real registration position. FIG. 4 shows a correlation coefficient image obtained by using the images shown in FIG. 2A and FIG. 2C as the reference image and the floating image for image registration, respectively. As shown in FIG. 4, the maximum correlation coefficient exists on the lower edge of the image. Importantly, near the real registration location in FIG. 4, there is a very steep peak of change of correlation coefficient, that is, the correlation coefficient at the location changes dramatically. Therefore, the extreme maximum value of gradient will appear near the real registration position in the gradient image of the correlation coefficient image. However, in the lower edge of the correlation coefficient image, although the maximum correlation coefficient appears, the change of correlation coefficient does not have a steep peak. FIG. 5 shows a gradient image of the correlation coefficient image shown in FIG. 4, which vividly illustrates the above problems.

According to an embodiment of the present disclosure, the gradient of the correlation coefficient is calculated according to the following formula.

$$g(i, j) = \sqrt{(r_{fg}(i-1, j) - r_{fg}(i+1, j))^2 + (r_{fg}(i, j-1) - r_{fg}(i, j+1))^2}$$

where g(i, j) represents the pixel value at the position of (i, j) in the gradient image, that is, the gradient; and $r_{fg}(i, j)$ represents the pixel value at the position of (i, j) in the correlation coefficient image, that is, the correlation coefficient.

In step S160, a pixel with extreme correlation coefficient in the correlation coefficient image is determined according to a pixel with extreme gradient in the gradient image. In other words, in this step, the pixel corresponding to the pixel with extreme gradient is determined in the correlation coefficient image.

Because the image is affected by various factors, in the spatial position, the pixel with extreme gradient in the gradient image may not be perfectly corresponding to the pixel with extreme correlation coefficient in the correlation coefficient image. However, the area near the real registration position in the correlation coefficient image can be determined according to the pixel with extreme gradient in the gradient image. Then, the pixel with extreme correlation coefficient can be searched in this region.

In step S180, the reference image and the floating image are registered according to the pixel with extreme correlation coefficient. After the pixel with extreme correlation coefficient is obtained, the position of the pixel in the correlation coefficient image can be known. According to this position, the translation vector required by the floating image can be determined, thus, the registration operation of the reference image and the floating image is completed.

The above image registration method and apparatus have high universality, which can be applied to various images. In addition, the image registration method and apparatus require a small amount of calculation, and thus can ensure real-time operation. Finally, the registration results obtained by the image registration method and apparatus are more accurate. Even if there are many new contents in the floating image compared with that of the reference image, the image registration method and apparatus can also obtain good registration results.

Figure 6:
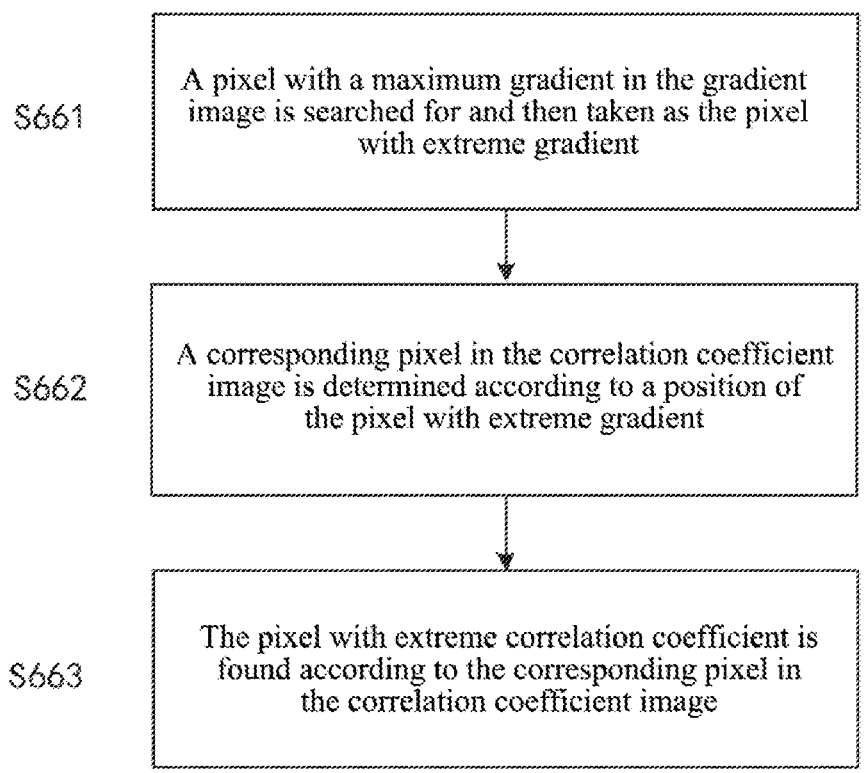
FIG. 6 shows a schematic flow chart of determining a pixel with extreme correlation coefficient in the correlation coefficient image according to an embodiment of the present disclosure.

FIG. 6 shows a schematic flow diagram of step S160 according to an embodiment of the present disclosure. As shown in FIG. 6, step S160 can include steps S661, S662, and S663.

In step S661, a pixel with maximum gradient in the gradient image is searched for and then is taken as the pixel with extreme gradient. FIG. 7 shows pixels in a gradient image according to an embodiment of the present disclosure. In this step, the entire gradient image is traversed to find a pixel with maximum gradient (the peak value of gradient), that is, a pixel with a maximum pixel value. As shown in FIG. 7, the pixels in the 9th row and the 3rd column of the gradient image are found to be a pixel with a maximum gradient of 17.1049. The found pixel can be taken as the pixel with extreme gradient.

In step S662, a corresponding pixel in the correlation coefficient image is determined according to a position of the pixel with extreme gradient searched by step S661. The correlation coefficient image shown in FIG. 8 is the basis for calculating the gradient image shown in FIG. 7. As described in step S661, the position of the pixel with extreme gradient in the gradient image is the 9th row and the 3rd column in the gradient image, as shown in FIG. 8, marked as the "the position of the peak value of gradient". Accordingly, the corresponding pixel in the correlation coefficient image is determined to be the pixel of the same position (the 9th row and the 3rd column in the image), and the correlation coefficient (i.e. the pixel value) represented by the corresponding pixel is 8.4122.

In step S663, find the pixel with extreme correlation coefficient according to the corresponding pixel in the correlation coefficient image determined according to step S662. In this step, in the correlation coefficient image, find the pixel with extreme correlation coefficient near the corresponding pixel determined by step S662.

According to an embodiment of the present disclosure, step S663 may include the following sub-steps.

First, an adjacent pixel of the corresponding pixel determined by step S662 is determined as a search point, so as to start the search from the search point.

Then, adjacent pixels of the search point are traversed, if the adjacent pixels are all smaller than the search point, the search point is taken as the pixel with extreme correlation coefficient; otherwise, a maximum adjacent pixel is taken as a new search point for re-finding.

Specifically, the adjacent pixels of the search point are traversed to find the pixel larger than the search point as the new search point. In general, each search point has four adjacent pixels. If the search point is located at the edge of the image but not at the vertices of the image, such as the position of the 9th row and the 3rd column of the image described above, it has three adjacent pixels. If the search point is one of the four vertices of the image, then the search point has only two adjacent pixels.

If the adjacent pixels of the search point are all smaller than the search point, the search point is taken as the pixel with extreme correlation coefficient. If there is a pixel greater than or equal to the pixel of the search point among the adjacent pixels of the search point, the adjacent pixels with maximum pixel value is taken as the new search point to repeat the above traversal process until the pixel with extreme correlation coefficient is found.

In the correlation coefficient image shown in FIG. 8, the pixel at the position of 9th row and the 3rd column is first taken as the search point to start the search. Among adjacent pixels of 8.4100, 8.4208 and 8.4138 of the search point, the maximum adjacent pixel is 8.4208 above the search point.

The pixel with the pixel value of 8.4208 is taken as a new search point, and its adjacent pixels are 8.4282, 8.4225, 8.4122 and 8.4180, and the maximum neighbor pixel is 8.4282 above the new search point. The pixel with the pixel value of 8.4282 is taken as a new search point, and the above processes are repeated. Until the pixel with the pixel value of 8.4340 is found, its adjacent pixels of 8.4321, 8.4330, 8.4303 and 8.4319 are all less than 8.4340, so the pixel with the pixel value of 8.4340 is the pixel with extreme correlation coefficient.

In the above embodiments, the algorithm and method for finding the pixel with extreme correlation coefficient according to the determined corresponding pixels in the correlation coefficient image are simple, intuitive and easy to implement.

Overall, according to the method described in step S661, step S662 and step S663 above that the pixel with extreme correlation coefficient in the correlation coefficient image is determined according to the pixel with extreme gradient in the gradient image, the pixel with extreme gradient in the whole gradient image is directly searched, and the pixel with extreme correlation coefficient in the correlation coefficient image is determined according to the searched pixel. The method is simple, has low computation and is fast to execute.

Figure 9:
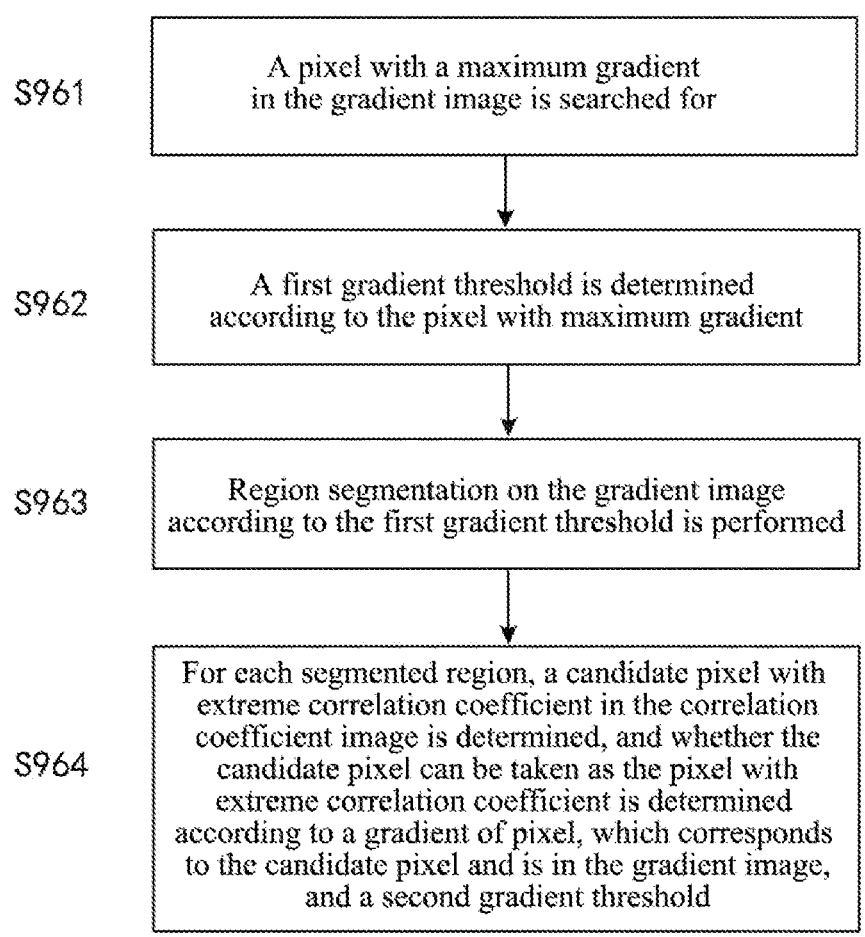
FIG. 9 shows a schematic flow chart of determining a pixel with extreme gradient in the gradient image according to another embodiment of the present disclosure.

FIG. 9 shows a schematic flow diagram of step S160 according to another embodiment of the present disclosure. As shown in FIG. 9, step S160 can include steps S961, S962, S963, and S964.

In step S961, a pixel with a maximum gradient in the gradient image is searched for. The operation of this step is similar to the previous step S661, except that the pixel with maximum searched gradient is no longer taken as the pixel with extreme gradient.

In step S962, a first gradient threshold is determined according to the pixel with maximum gradient.

According to an embodiment of the present disclosure, the first gradient threshold is calculated according to the following formula:

$$T_1 = T_{max} * In,$$

where $T_1$ represents the first gradient threshold, $T_{max}$ represents the pixel with maximum gradient, and $In$ represents a coefficient.

In step S963, region segmentation is performed on the gradient image according to the first gradient threshold. By the region segmentation, the possible positions of the pixel with extreme gradient can be determined. Furthermore, it can help to determine the pixel with extreme correlation coefficient in the correlation coefficient image.

According to an embodiment of the present disclosure, the gradient image can be segmented directly by the threshold segmentation method according to the first gradient threshold.

According to another embodiment of the present disclosure, step S963 may include the following sub-steps: first, a progressive scan of the gradient image is performed according to the first gradient threshold, to search for seed pixels larger than the first gradient threshold. Then, region segmentation on the gradient image is performed according to the seed pixels, to obtain all of the segmented regions. Optionally, in this case, region segmentation on the gradient image is performed according to a region growing algorithm by taking the seed pixels as the starting point. The region growing algorithm is a mature image segmentation algorithm, which can more accurately determine the possible regions of the pixel with extreme gradient in the gradient image, so as to ensure the accuracy of image registration.

In step S964, for each segmented region, a candidate pixel with extreme correlation coefficient in the correlation coefficient image is determined, and whether the candidate pixel can be taken as the pixel with extreme correlation coefficient is determined according to the gradient of pixel, which corresponds to the candidate pixel and is in the gradient image, and a second gradient threshold.

Specifically, the following operations for the segmented region can be performed until the pixel with extreme correlation coefficient is obtained.

1) Search for the pixel with maximum gradient, so as to take it as the pixel with extreme gradient. This operation is similar to step S661. The difference between the two is that the whole gradient image is searched in step S661, while only the region segmented by step S963 in the gradient image is searched in this operation. For the sake of brevity, the execution is not detailed here.

2) Determine a corresponding pixel in the correlation coefficient image according to a position of the pixel with extreme gradient.

3) Find the pixel with extreme correlation coefficient image according to the corresponding pixel in the correlation coefficient image, so as to take it as the candidate pixel.

Operations 2) and 3) are similar to steps S662 and S663, respectively, and will not be repeated here for brevity. However, the pixel with extreme correlation coefficient found in step S663 can be taken as the basis for the registration of the reference image and the floating image. In other words, the pixel with extreme correlation coefficient found in step S663 can be directly used for the registration of the reference image and the floating image. However, in this operation, the determined pixel with extreme correlation coefficient is the candidate pixel, which only has the possibility of becoming the pixel that is finally expected to be obtained for the registration of the reference image and the floating image.

4) Whether the candidate pixel can be directly used for registration of reference image and floating image is determined.

Specifically, the corresponding pixel in the gradient image is determined according to the position of the candidate pixel with extreme the correlation coefficient image. The images shown in FIG. 7 and FIG. 8 are taken as an example. The position of the candidate pixel with an extreme correlation coefficient of 8.4340 in the correlation coefficient image is Row 6 and Column 4. Then the corresponding pixel on this position in the gradient image is determined to be 2.1060. Whether the candidate pixel can be taken as the pixel with extreme correlation coefficient is determined according to the gradient of pixel, which corresponds to the candidate pixel and is in the gradient image, and a second gradient threshold determined by the pixel with maximum gradient in segmented region. Among them, the second gradient threshold can be determined according to the pixel with maximum gradient in the segmented region multiplied by a specific coefficient. The value range of this particular coefficient may be [0.15, 0.25]. If the candidate pixel can be taken as the pixel with extreme correlation coefficient, the reference image and the floating image can be registered according to the candidate pixel, that is, step S180 is executed. If the candidate pixel cannot be taken as the pixel with extreme correlation coefficient, the new candidate pixel is searched for again and whether the new candidate pixel can be taken as the pixel with extreme correlation coefficient is determined again until the pixel with extreme correlation coefficient is obtained.

According to an example of the present disclosure, if the gradient of pixel corresponding to the candidate pixel is lower than the second gradient threshold, the candidate pixel is taken as the pixel with extreme correlation coefficient, and it can be directly used for registration of the reference image and the floating image. Otherwise, go to the next segmented region to rerun operations 1) to 4) until the pixel with extreme correlation coefficient in the correlation coefficient image is determined.

Those skilled in the art can understand that while an embodiment of the present disclosure is described in the order described above, the order of these steps is only an example and not a limitation of the present disclosure.

For example, in one example, in step S963, a seed pixel can be found first, a segmented region is obtained through the region growing algorithm, and then step S964 is performed for the segmented region. If the pixel with extreme correlation coefficient in the correlation coefficient image is determined in step S964, the method can proceed to step S180; otherwise, go back to step S963, another seed pixel is found by scanning the gradient image, and another segmented region is obtained by the region growing algorithm. Then, the operations are similar to those described above. Repeat the above operation, until the pixel with extreme correlation coefficient in the correlation coefficient image is determined.

In another example, in step S963, all the segmented regions are obtained by region segmentation. In step S964, if the pixel with extreme correlation coefficient is not obtained in a segmented region, proceed directly to the next region until the pixel with extreme correlation coefficient is obtained.

According to the method described in step S961, step S962, step S963 and step S964 for determining the pixel with extreme correlation coefficient in the correlation coefficient image according to the pixel with extreme gradient in the gradient image, the problem that the point with maximum gradient does not appear in the position of real displacement when the quality of image is poor or the size of image is too small can be avoided. In this case, although the gradient of correlation coefficient near the wrong position is the largest, the gradient changes gently, while the gradient near the real position changes sharply. Therefore, in the above method, the region of which the gradient is large but change gently is eliminated according to the gradient change. Thus, the position of the true displacement in the correlation coefficient image can be predicted more reasonably, which ensures the accuracy of the registration operation.

Figure 10:
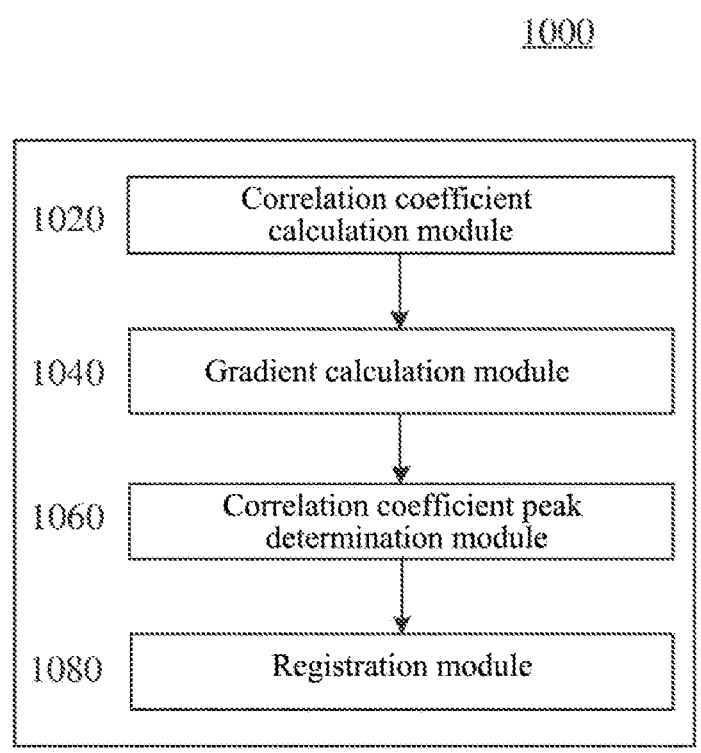
FIG. 10 shows a schematic block diagram of an image registration apparatus according to an embodiment of the present disclosure.

According to another aspect of the present disclosure, an image registration apparatus is further provided. FIG. 10 shows the image registration apparatus 1000 according to an embodiment of the present disclosure. As shown in FIG. 10, the image registration apparatus 1000 includes a correlation coefficient calculation module 1020, a gradient calculation module 1040, a correlation coefficient peak determination module 1060 and a registration module 1080.

The correlation coefficient calculation module 1020 is configured to calculate a correlation coefficient image between a reference image and a floating image. The gradient calculation module 1040 is configured to calculate a gradient image of the correlation coefficient image. The correlation coefficient peak determination module 1060 is configured to determine a pixel with extreme correlation coefficient in the correlation coefficient image according to a pixel with extreme gradient in the gradient image. The registration module 1080 is configured to register the reference image and the floating image according to the pixel with extreme correlation coefficient.

According to an embodiment of the present disclosure, the correlation coefficient peak determination module 1060 includes:

a first searching sub-module, configured to search for a pixel with maximum gradient in the gradient image, so as to take it as the pixel with extreme gradient;

a determining sub-module, configured to determine a corresponding pixel in the correlation coefficient image according to a position of the pixel with extreme gradient; and a first finding sub-module, configured to find the pixel with extreme correlation coefficient according to the corresponding pixel in the correlation coefficient image.

Optionally, the first finding sub-module includes: a search point determination unit, configured to determine an adjacent pixel of the corresponding pixel in the correlation coefficient image as a search point; and a finding unit, configured to traverse adjacent pixels of the search point, if the adjacent pixels are all smaller than the search point, the search point is taken as the pixel with extreme correlation coefficient; otherwise, a maximum adjacent pixel is taken as a new search point for re-finding.

According to another embodiment of the present disclosure, the correlation coefficient peak determination module 1060 includes:

a second searching sub-module, configured to search for a pixel with a maximum gradient in the gradient image;

a second determining sub-module, configured to determine a first gradient threshold according to the pixel with maximum gradient;

a segmentation sub-module, configured to perform region segmentation on the gradient image according to the first gradient threshold; and an obtaining sub-module, configured to, for each segmented region, determine a candidate pixel with extreme correlation coefficient in the correlation coefficient image, and determine whether the candidate pixel can be taken as the pixel with extreme value obtained by the correlation coefficients according to the gradient of pixel, which corresponds to the candidate pixel and is in the gradient image, and a second gradient threshold.

Optionally, the segmentation sub-module includes:

a seed pixel searching unit, configured to perform a progressive scan on the gradient image according to the first gradient threshold, to search for seed pixels larger than the first gradient threshold; and a segmentation unit, configured to perform region segmentation on the gradient image according to the seed pixels, to obtain all of the segmented regions.

Optionally, the segmentation unit includes a segmentation execution sub-unit, configured to, perform region segmentation on the gradient image according to a region growing algorithm by taking the seed pixels as the starting point.

Optionally, the second determining sub-module includes a threshold calculation unit, configured to calculate the first gradient threshold according to a formula $T_1=T_{max}*In$, where $T_1$ represents the first gradient threshold, $T_{max}$ represents the pixel with maximum gradient, and In represents a coefficient.

In another angle, the above image registration apparatus may include a memory and a processor. The memory is configured to store program, and the processor is configured to run the program.

The program is used to perform the above image registration method when being run by the processor.

According to an embodiment of the present disclosure, the program is used to perform the following steps when being run by the processor:

a correlation coefficient image between a reference image and a floating image is calculated;

a gradient image of the correlation coefficient image is calculated;

a pixel with extreme correlation coefficient in the correlation coefficient image is determined according to a pixel with extreme gradient in the gradient image; and the reference image and the floating image is registered according to the pixel with extreme correlation coefficient.

According to another aspect of the present disclosure, an image stitching method is further provided. The image stitching method includes the steps of registering the reference image and the floating image according to the above image registration method and the steps of stitching the reference image and the floating image according to the registered result.

In the image stitching method, the accurate position relation between the reference image and the floating image is obtained quickly by image registration operation, so the image stitching operation can be faster and more accurate.

Figure 11:
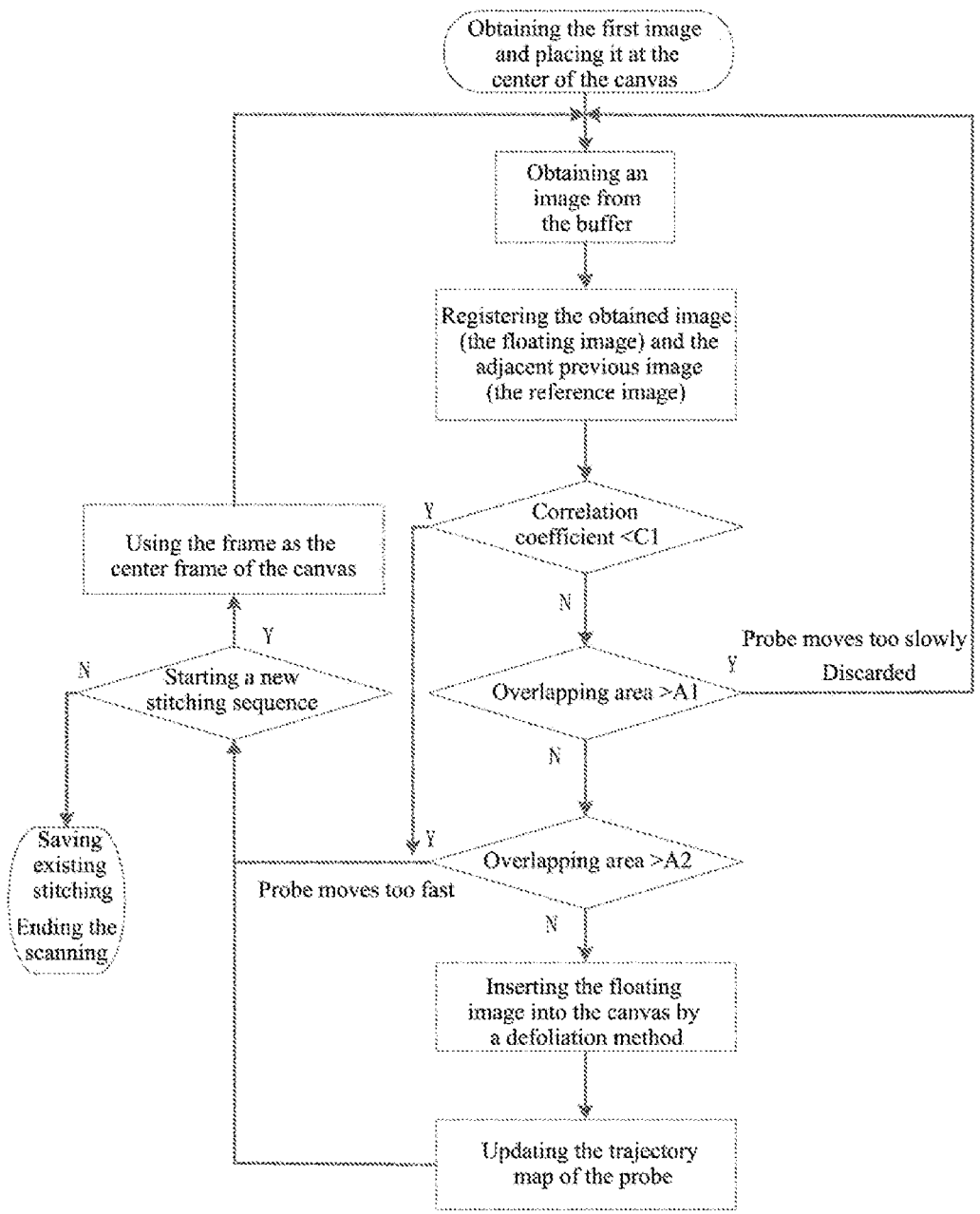
FIG. 11 shows an image stitching method according to an embodiment of the present disclosure.

FIG. 11 shows an image stitching method 1100 according to an embodiment of the present disclosure. As shown in FIG. 11, the image stitching method 1100 includes a registering step and a stitching step. In the registering step, the reference image and the floating image are registered; and in the stitching step, the floating image is inserted into the canvas by a defoliation method. Those skilled in the art can understand that the defoliation method is only an example, not a limitation of the present disclosure, and other fusion methods can be adopted. In addition to the above two steps, the image stitching method 1100 can also include other steps. The image stitching method 1100 is described in detail in combination with FIG. 11 below.

First, the first image is obtained and is placed at the center of the canvas. The first image is taken as the reference image. Another image adjacent to the first image is obtained from the buffer and taken as a floating image. Adjacent images usually mean the images are adjacent in the acquisition order. The image registration method described above is used to register the reference image and the floating image. Whether the extreme maximum correlation coefficient determined in the image registration method is less than the correlation coefficient threshold C1 is judged. If the correlation coefficient is less than the correlation coefficient threshold C1, it means that the acquisition apparatus such as the probe of the microscope moves too fast in the process of image acquisition. The image stitching method 1100 can also include determining the overlapping area between the reference image and the floating image. If the overlapping area is greater than the first area threshold A1, it means that the acquisition apparatus moves too slow in the process of image acquisition, then the current floating image does not contain more meaningful image information, and the floating image can be discarded. If the overlapping area is less than the second area threshold A2, it also means that the acquisition apparatus moves too fast in the process of image acquisition. If the correlation coefficient is greater than or equal to the correlation coefficient threshold C1 and the overlapping area is greater than or equal to the second area threshold A2 and less than or equal to the first area threshold A1, the stitching operation is performed, for example, the floating image is inserted into the appropriate position in the canvas by the defoliation method. Optionally, after the stitching operation, the image stitching method 1100 can also include a step of updating the trajectory map of the acquisition apparatus.

At this point, for example, whether to start a new stitching sequence can be artificially decided. If it is decided to start a new stitching sequence, the current floating image is taken as a new reference image, and can be placed at the center of the canvas. Another image adjacent to the new reference image is taken from the buffer as a new floating image to perform registration and stitching operations again. If it is decided not to start a new stitching sequence, the existing stitching image (if it exists) can be saved and the operation is ended.

When the acquisition apparatus moves too fast in the process of acquiring images, the reliability of the stitching quality is not high, and the results are questionable. When the correlation coefficient is too small or the overlapping area is too small, accurate registration cannot be performed. Since the positional relationship between adjacent images cannot be obtained through registration, the stitching operation may not be performed, and it is directly determined as described above whether to start a new stitching sequence. Thus, unnecessary calculations can be avoided, and system efficiency can be improved. In addition, the image stitching method 1100 may further include a step of prompting the user in various ways, so that the user knows the current situation in time and makes an appropriate operation selection. For example, the current floating image is marked with a border of a specific color.

When the acquisition apparatus moves too slow in the process of acquiring images, the stitching operation does not make much sense because the overlapping area of adjacent images is very large. When the acquisition apparatus moves too slow in the process of acquiring images, the stitching operation does not make much sense because the overlapping area of adjacent images is very large. Thus, the current floating image can be discarded, and another image can be obtained from the buffer as a new floating image. The new floating image is registered and stitched with the reference image. This can also avoid unnecessary calculations and improve system efficiency.

According to still another aspect of the present disclosure, an image stitching device is also provided. The image stitching device may perform the above image stitching method, and may include the image registration apparatus and the image stitching apparatus described above. Among them, the image registration apparatus is used for registering a reference image and a floating image according to the image registration method. The image stitching apparatus is configured to stitch the reference image and the floating image according to the registration result of the image registration apparatus.

In another angle, the above image stitching device may include a memory and a processor. The memory is configured to store program, and the processor is configured to run the program.

Among them, the program is used to perform the following steps when being run by the processor:

registering the reference image and the floating image according to the above image registration method; and stitching the reference image and the floating image according to the registered result.

By reading the detailed description of the image registration method, the image registration apparatus, and the image stitching method above, the composition and technical effects of the image stitching apparatus can be understood. For brevity, we will not repeat them here.

In addition, a storage medium is further provided according to the embodiments of the present disclosure. A program instruction is stored in the storage medium. When the program instruction is run by a computer or processor, the computer or processor is made to perform the corresponding steps of the image registration method or image stitching method according to the embodiments of the present disclosure, and is used to realize the corresponding modules or apparatuses in the image registration apparatuses or image stitching devices according to the embodiments of the present disclosure. The storage medium may include, for example, a memory card of a smart phone, a storage component of a tablet computer, a hard disk of a personal computer, a read-only memory (ROM), an erasable programmable read-only memory (EPROM), a portable compact disk read-only memory (CD-ROM), a USB memory, or any combination of the above storage mediums. The computer-readable storage medium can be any combination of one or more computer-readable storage medium.

Although exemplary embodiments have been described herein with reference to the accompanying drawings, it should be understood that the above exemplary embodiments are only exemplary and are not intended to limit the scopes of the present disclosure herein. Those skilled in the art can make various changes and modifications without departing from the scope and spirit of the present disclosure. All these changes and modifications are intended to be included in the scopes of the present disclosure as claimed in the appended claims.

Those of ordinary skill in the art may realize that the unit and algorithm steps of each example described in combination with the disclosed embodiments herein can be realized by the combination of electronic hardware, or computer software and electronic hardware. Whether these functions are performed in hardware or software depends on the specific application and design constraints of the technical solution. Professional technicians may use different methods for each specific application to realize the described functions, but such implementation shall not be considered beyond the scope of the present disclosure.

In several embodiments provided by the present application, it should be understood that the disclosed device and methods can be realized in other ways. For example, the apparatus embodiments described above are only schematic, for example, the division of the units is only a logical function division, and there can be another division method in actual implementation, for example, multiple units or components can be combined or integrated into another apparatus, or some features can be ignored or not implemented.

A number of specific details are described in the specifications provided herein. However, it is understood that embodiments of the present disclosure may be practiced without these specific details. In some examples, well-known methods, structures and techniques are not shown in detail, so as not to obscure the understanding of this specification.

Similarly, it should be understood that in order to simplify the present disclosure and to help understand one or more aspects of the present disclosure, in the description of exemplary embodiments of the present disclosure, various features of the present disclosure are sometimes grouped together into a single embodiment, diagram, or description thereof. However, the method of the present disclosure should not be interpreted to reflect the intention that the claimed features of the present disclosure are more than those expressly defined in each claim. More specifically, as defined in the corresponding claims, the present disclosure conception is that the corresponding technical problems can be solved with features less than all the features of a single embodiment disclosed. Therefore, the claims according to the specific embodiment are hereby incorporated into the specific embodiment, where each claim itself is a separate embodiment of the present disclosure.

It will be understood by those skilled in the art that all features disclosed in this specification (including accompanying claims, abstracts and drawings) and all processes or units of any disclosed method or apparatus can be combined by any combination except for the mutual exclusion of features. Unless otherwise expressly stated, each feature disclosed in this specification (including accompanying claims, abstracts, and drawings) may be replaced by an alternative feature providing the same, equivalent, or similar purpose.

Moreover, those skilled in the art can understand that although some embodiments described herein include some features included in other embodiments rather than others, the combination of features of different embodiments means that they are within the scope of the present disclosure and form different embodiments. For example, in the claims, any one of the embodiments claimed can be used in any combination.

Each component embodiment of the present disclosure may be implemented in hardware, in software modules running on one or more processors, or in combination thereof. It should be understood by those skilled in the art that some or all functions of some modules in the image registration apparatus and the image stitching device according to the embodiment of the present disclosure can be realized in practice by using a microprocessor or a digital signal processor (DSP). The present disclosure may also be implemented as an apparatus program (for example, a computer program and a computer program product) for performing part or all of the methods described herein. Such a program to implement the present disclosure may be stored on a computer-readable medium, or may have one or more signals in the form. Such signals can be downloaded from Internet sites, or provided on carrier signals, or in any other form.

It should be noted that the above embodiments of the present disclosure to explain rather than limit the present disclosure, and those skilled in the art may design alternative embodiments without departing from the scope of the attached claim. In a claim, any reference symbol between the brackets should not be constructed as a limitation on the claim. The word "include" does not exclude the presence of components or steps that are not listed in the claim. The word "a", "an" or "one" that precedes the symbol does not exclude the existence of multiple such components. The present disclosure can be achieved by means of hardware including several different components and by means of a computer with appropriate programming. In the claims of the units of several apparatus listed, several of these apparatus can be embodied through the same hardware item. The use of words first, second, and third does not represent any order. These words can be interpreted as names.

The above, only for the specific embodiment of the present disclosure or a description of the specific embodiment, the scope of protection of the present disclosure is not limited to this, any technical person familiar with the technical field disclosed in the scope of the technology, can easily think of change or replacement, should be covered within the scope of protection of the present disclosure. The protection scopes of the present disclosure shall be subject to the protection scopes of the claims.

What is claimed is:

1. An image registration method, comprising:
    calculating a correlation coefficient image between a reference image and a floating image;
    calculating a gradient image of the correlation coefficient image;
    determining a pixel with extreme correlation coefficient in the correlation coefficient image according to a pixel with extreme gradient in the gradient image; and
    registering the reference image and the floating image according to the pixel with extreme value of correlation coefficient,
    wherein the determining a pixel with extreme correlation coefficient in the correlation coefficient image according to a pixel with extreme gradient in the gradient image comprises:
    searching for a pixel with a maximum gradient in the gradient image as the pixel with extreme gradient;
    determining a corresponding pixel in the correlation coefficient image according to a position of the pixel with extreme gradient; and
    finding the pixel with extreme correlation coefficient according to the corresponding pixel in the correlation coefficient image.

2. The method according to claim 1, wherein the finding the pixel with extreme correlation coefficient according to the corresponding pixel in the correlation coefficient image comprises:
    determining an adjacent pixel of the corresponding pixel in the correlation coefficient image as a search point; and
    traversing adjacent pixels of the search point and taking, if the adjacent pixels are all smaller than the search point, the search point as the pixel with extreme correlation coefficient; otherwise, taking a maximum adjacent pixel as a new search point for re-finding.

3. An image registration apparatus, comprising:
    a memory, configured to store program;
    a processor, configured to run the program;
    wherein the program is used to perform following steps when being run by the processor:
    calculating a correlation coefficient image between a reference image and a floating image;
    calculating a gradient image of the correlation coefficient image;
    determining a pixel with extreme correlation coefficient in the correlation coefficient image according to a pixel with extreme gradient in the gradient image; and
    registering the reference image and the floating image according to the pixel with extreme correlation coefficient,
    wherein the determining a pixel with extreme correlation coefficient in the correlation coefficient image according to a pixel with extreme gradient in the gradient image performed by the program comprises:
    searching for a pixel with a maximum gradient in the gradient image as the pixel with extreme gradient;
    determining a corresponding pixel in the correlation coefficient image according to a position of the pixel with extreme gradient; and finding the pixel with extreme correlation coefficient according to the corresponding pixel in the correlation coefficient image.

4. The apparatus according to claim 3, wherein the finding the pixel with extreme correlation coefficient according to the corresponding pixel in the correlation coefficient image performed by the program comprises:

determining an adjacent pixel of the corresponding pixel in the correlation coefficient image as a search point; and traversing adjacent pixels of the search point and taking, if the adjacent pixels are all smaller than the search point, the search point as the pixel with extreme correlation coefficient; otherwise, taking a maximum adjacent pixel as a new search point for re-finding.

5. An image stitching method, comprising:

registering the reference image and the floating image according to the image registration method according to claim 1; and stitching the reference image and the floating image according to the registered result.

6. An image stitching device, comprising:

a memory, configured to store program;

a processor, configured to run the program;

wherein the program is used to perform following steps when being run by the processor:

registering the reference image and the floating image according to the image registration method according to claim 1; and stitching the reference image and the floating image according to the registered result.

* * * * *

UNITED STATES PATENT AND TRADEMARK OFFICE
CERTIFICATE OF CORRECTION

| | | |
|---|---|---|
| PATENT NO. | : 11,200,687 B2 | |
| APPLICATION NO. | : 16/850032 | |
| DATED | : December 14, 2021 | |
| INVENTOR(S) | : Shao et al. | |

It is certified that error appears in the above-identified patent and that said Letters Patent is hereby corrected as shown below:

On the Title Page

Item (73) Assignee, Please change "SUZHOU MICROVIEW MEDICAL TECHNOLOGIES CO., LTD., SUZHOU (CN)" to --SUZHOU MICROVIEW MEDICAL TECHNOLOGIES CO., LTD., SUZHOU (CN); WUXI HISKY MEDICAL TECHNOLOGIES CO., LTD., WUXI, (CN)--.

Signed and Sealed this
Fifth Day of August, 2025

Coke Morgan Stewart
*Acting Director of the United States Patent and Trademark Office*